(12) United States Patent
Choi

(10) Patent No.: US 6,999,784 B1
(45) Date of Patent: Feb. 14, 2006

(54) METHOD FOR CONTROLLING POWER OF BASE STATION

(75) Inventor: Seung Woog Choi, Kyonggi--do (KR)

(73) Assignee: LG Information & Communications, Ltd., Seoul (KR)

( * ) Notice: Subject to any disclaimer, the term of this patent is extended or adjusted under 35 U.S.C. 154(b) by 773 days.

(21) Appl. No.: 09/655,402

(22) Filed: Sep. 5, 2000

(30) Foreign Application Priority Data

Sep. 2, 1999 (KR) ................................ 1999-37178

(51) Int. Cl.
*H04B 7/00* (2006.01)
*H04Q 7/20* (2006.01)

(52) U.S. Cl. ...................... 455/522; 455/432; 455/436; 455/443; 455/444; 370/320; 370/331; 370/318

(58) Field of Classification Search ................. 455/432, 455/436, 442, 443, 444, 522, 69, 525, 435.2, 455/439; 370/320, 331, 318
See application file for complete search history.

(56) References Cited

U.S. PATENT DOCUMENTS

| | | | | |
|---|---|---|---|---|
| 5,353,332 A | * | 10/1994 | Raith et al. | 455/455 |
| 5,603,096 A | * | 2/1997 | Gilhousen et al. | 455/69 |
| 5,917,811 A | * | 6/1999 | Weaver et al. | 370/332 |
| 5,946,622 A | * | 8/1999 | Bojeryd | 455/444 |
| 5,999,816 A | * | 12/1999 | Tiedemann et al. | 455/437 |
| 6,253,085 B1 | * | 6/2001 | Bender | 455/442 |
| 6,266,529 B1 | * | 7/2001 | Chheda | 455/436 |
| 6,321,089 B1 | * | 11/2001 | Han | 455/438 |
| 6,418,320 B1 | * | 7/2002 | Yoshida et al. | 455/522 |
| 6,487,191 B1 | * | 11/2002 | Kang et al. | 370/342 |
| 6,510,319 B1 | * | 1/2003 | Baum et al. | 455/442 |
| 6,512,925 B1 | * | 1/2003 | Chen et al. | 455/442 |
| 6,539,226 B1 | * | 3/2003 | Furukawa et al. | 455/442 |

FOREIGN PATENT DOCUMENTS

JP 0680160 * 4/1995

* cited by examiner

*Primary Examiner*—William Trost
*Assistant Examiner*—Stephen D'Agosta
(74) *Attorney, Agent, or Firm*—Fleshner & Kim, LLP

(57) ABSTRACT

A method for controlling power of a mobile station by a base station in a multilayered communication system is disclosed. In the present invention, a base station serving a picocell does not lower a transmission signal power of a mobile station within a soft handoff region between a macrocell and a picocell. Thus, the mobile station can transmit signals at a sufficient level of transmission power to successfully execute a soft handoff.

20 Claims, 5 Drawing Sheets

METHOD FOR CONTROLLING POWER OF BASE STATION

BACKGROUND OF THE INVENTION

1. Field of the Invention

The present invention relates to a mobile communication system, and more particularly, to a method for power control in a multi-layer base station during a handoff.

2. Background of the Related Art

In a mobile communication system such as a code division multiple access (CDMA) communication system, a handoff must be executed when a mobile station moves from one service region to another in order to receive a continuous communication service from a base station without interruption. Such handoffs may be classified into a soft handoff, a softer handoff, and a hard handoff, depending on a destination base station, a handoff time and the use of channel resources between a serving base station and the destination base station. Here, a serving base station means a base station which provides a service to a mobile station before a handoff and a destination base station means a base station which will provide service to the mobile station after a handoff.

Generally, a soft handoff occurs when a mobile station moves from one base station to another base station wherein the base stations have a common frequency and frame offset. In the soft handoff, a communication with a new base station begins before communication with a base station currently in service ends, thereby maintaining a continuous traffic path. A softer handoff occurs when a mobile station moves between sectors of a same base station having the same frequencies. A hard handoff occurs when a mobile station moves from one base station to another base station belonging to a different mobile switching center (MSC) wherein the base stations have traffic channels of different frequencies or traffic channels of different frame offsets. In the hard handoff, communication with a base station currently in service ends before communication with a new base station begins. A mobile communication system and the handoff operation will next be explained.

FIG. 1 shows a mobile communication system in the related art including mobile stations 100a~100n, base stations 101a~101n a base station controller 102, a base station controller manager 103, and a mobile switching center 104. The base stations 101a~101n may use a same frequency while transmitting pilot signals of different frame offsets to the mobile stations 100a~100n, and the mobile stations 100a~100n receives these pilot signals to distinguish the base stations 101a~101n. FIG. 2 illustrates a service region of a base station in FIG. 1.

Referring to FIG. 2, a base station A provides service to mobile stations in base station A region and a base station B provides service to mobile stations in base station B region. Each service region is divided into a plurality of sectors called a cell. Also, as a mobile station moves, the mobile station may pass through a handoff region in which service can be provided by both base stations A and B.

FIG. 3 is a chart showing the flow of signals during a handoff in a mobile communication system in the related art. Generally, a handoff is executed in a mobile communication system when a mobile station moves from one cell to another, and particularly, a soft handoff is executed when a mobile station moves from one base station to another base station controlled by a same base station controller. For purposes of explanation, assume base station A is a serving base station of a mobile station, and base station B is a destination base station of the mobile station.

Referring to FIG. 3, a mobile station first transmits a Pilot Strength Measuring Message (PSMM) to base station A if the mobile station determines that a pilot signal, which is not from base station A, has a strength higher than a predetermined threshold value T_ADD (S300). The base station controller then analyzes the PSMM from the mobile station and requests base station B to allocate a channel to execute a soft handoff, if the pilot signal is determined to be from base station B rather than base station A. Upon allocating a channel according to the request from the base station controller, base station B notifies the base station controller of the allocation. Thereafter, the base station controller transmits an extended handoff direction message to the mobile station through both base station A and base station B to set a new active group (S301). An active group includes the mobile station and base stations having communication channels established with the mobile station.

Accordingly, the mobile station enters a soft handoff state after adding base station B to the active group and transmitting a handoff complete message to both base station A and base station B. Thus, the mobile station can receive service by base station B without being cut off from communication (S302).

While taking into consideration the number of subscribers as well as the quality of communication, the CDMA mobile communication system performs a power control such that signals from different mobile stations are received at a base station with relatively same power level. Under the power control, a mobile station located far from a base station transmits signals at a relatively high power level and a mobile station located close to a base station transmits power at a relatively low power level. This power control is also performed during a handoff.

Particularly, a base station transmits a power control command to a mobile station to reduce the power if the base station receives a transmission signal power, which is higher than average, while a handoff is being executed. Similarly, the base station transmits a power control command to the mobile station to increase the power if the base station receives a transmission signal power, which is lower than average, while a handoff is being executed. Moreover, mobile stations located in a handoff region may receive a power control command from more than one base stations, depending on the characteristic of the handoff. As a result, a mobile station does not increase the power until a power control command to increase the power is received from all base stations involved in the handoff, i.e. the serving base station and the destination base stations.

However, in the power controlling method of the related art, a handoff cannot be smoothly executed in multi-layered cells such as a macrocell and a picocell, as shown in FIG. 4.

Referring to FIG. 4, assume that service in a macrocell is provided by base station A and service in picocells are provided by base stations B and C, respectively. In the case shown, base station B does not match the power levels of a forward link coverage and a reverse link coverage. As a result, a mobile station in the picocell region of base station B does not transmit signals at a maximum power at the forward link coverage. On the other hand, base station C matches the power levels of the forward link coverage and the reverse link coverage, and a mobile station in the picocell region of base station C transmits signals at a maximum power at the forward link coverage.

Under the above state, if a mobile station enters a handoff region between a picocell region of base station B and a macrocell region of base station A while moving from the picocell to the macrocell, base station B does not transmit a power control command to the mobile station to increase the signal power. As a result, even if the mobile station determines that a pilot signal from base station A has a strength higher than the predetermined threshold value T_ADD, the power of a PSMM signal from the mobile station (S500), as received by base station A, would be too low. Thus, an extended handoff direction message (S501) as well as a handoff complete message (S502) required in a normal handoff procedure cannot be transmitted, and a soft handoff cannot be executed as shown in FIG. 5.

Similarly, if a mobile station enters a handoff region between a picocell region of base station C and a macrocell region of base station A while moving from the macrocell to the picocell, base station A does not transmit a power control command to the mobile station to increase a signal power. Accordingly, the power of a PSMM signal from the mobile station, as received by base station C, would be too low, and an extended handoff direction message as well as a handoff complete message required in a normal handoff procedure cannot be transmitted. Thus, a soft handoff cannot be executed.

As described above, in a mobile communication system having multi-layered cells, a handoff may not be executed smoothly because a channel would be allocated to only one of the base station during a handoff. Therefore, a constant level of quality in the communication service to users cannot be maintained, limiting the system capacity.

SUMMARY OF THE INVENTION

Accordingly, an object of the present invention is to solve at least the problems and disadvantages of the related art.

An object of the present invention is to provide a more efficient handoff procedure in a multilayered cell in a CDMA communication system.

Another object of the present invention is to provide a method for power control of a mobile station during a soft handoff in a multilayered cell in a CDMA communication system.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodies and broadly described herein, a power control method for a base station in a multilayered cells includes controlling a transmission power of a mobile station from a base station serving a picocell to provide a handoff between a macrocell and the picocell when the mobile station moves between the macrocell and the picocell. Namely, the transmission power of the mobile station is controlled to be maintained or increased. Also, the a power level of the reverse link coverage in a picocell is set greater than a forward link coverage for the mobile station.

BRIEF DESCRIPTION OF THE DRAWINGS

The invention will be described in detail with reference to the following drawings in which like reference numerals refer to like elements wherein.

DETAILED DESCRIPTION OF THE PREFERRED EMBODIMENT

Reference will now be made in detail to the preferred embodiments of the present invention, examples of which are illustrated in the accompanying drawings. Generally, the present invention suggests a power control method for a base station, in which a transmission power of a mobile station is controlled such that a soft handoff between base stations providing service in respective cells is executed smoothly in a multilayered base station system having macrocells and picocells. Also, the present invention establishes a reverse link coverage and a forward link coverage of a picocell to be different.

Typically, the greater the distance between a mobile station and a base station, the more a signal wave from a mobile station becomes attenuated before reaching a base station. Thus, if a distance between a mobile station and a base station is greater than a predetermined distance, the signal from the mobile station cannot reach the base station.

Here, a reverse link coverage denotes a maximum distance at which a signal from a mobile station can reach a base station. The reverse link coverage can vary with the maximum transmission power of the mobile stations as well as environmental interference. This is because the power of signal waves received at a base station may be reduced due to interference from using a same frequency in the transmission of signal waves, even if a plurality of mobile stations use a same power. Therefore, the greater the number of users, the smaller the reverse link coverage. Also, since a base station can attenuate a signal wave using a signal attenuator, the base station can control the size of the reverse link coverage to any desired level.

On the other hand, the forward link coverage is dependent upon the power level transmitted from a base station. This means that the forward link coverage can be controlled by varying the power of signals transmitted from the base station.

A mobile communication system in the related art controls parameters of base stations such that the forward link coverage equals the reverse link coverage in the formation of the cells. However, the present invention implements picocells within the service region of a macrocell, and the reverse link coverage of the picocell is set greater than the forward link coverage.

Figure 1:
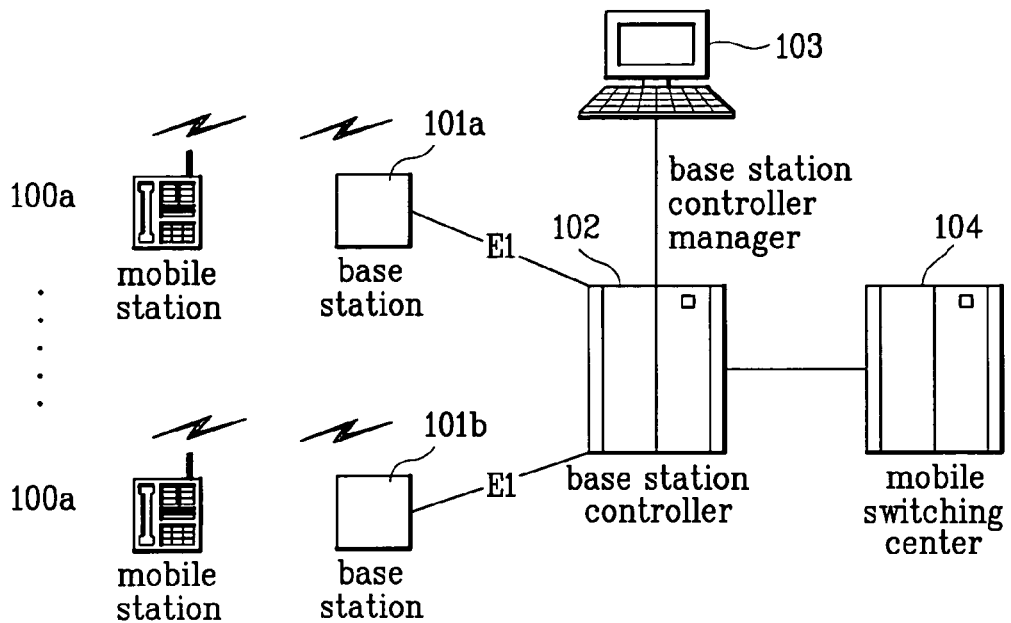
FIG. 1 shows a mobile communication system in the related art.
Figure 2:
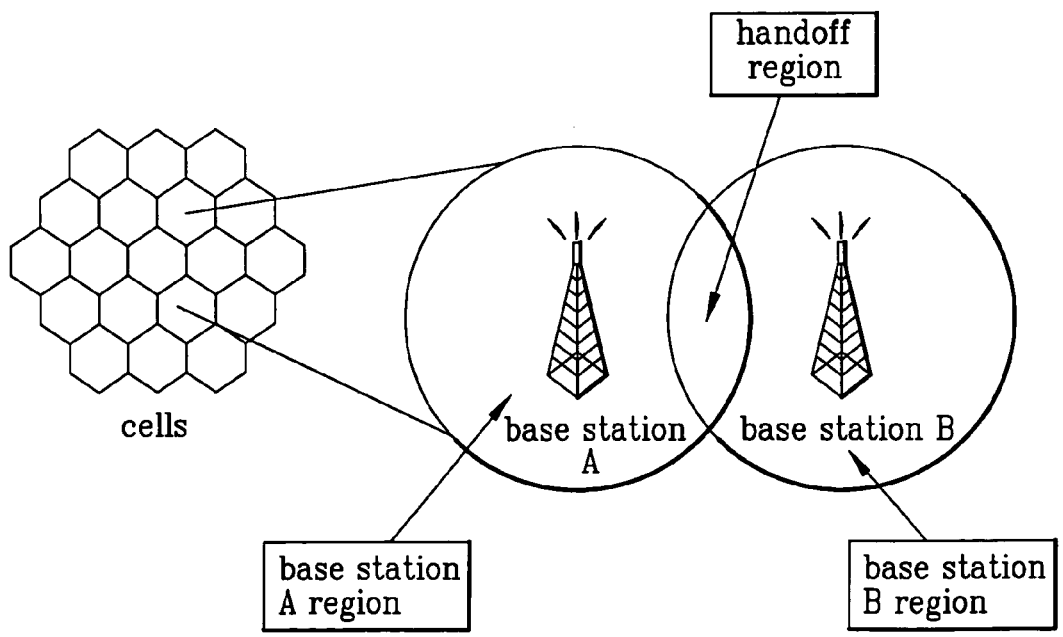
FIG. 2 shows a service region of base stations in a mobile communication system of FIG. 1.
Figure 3:
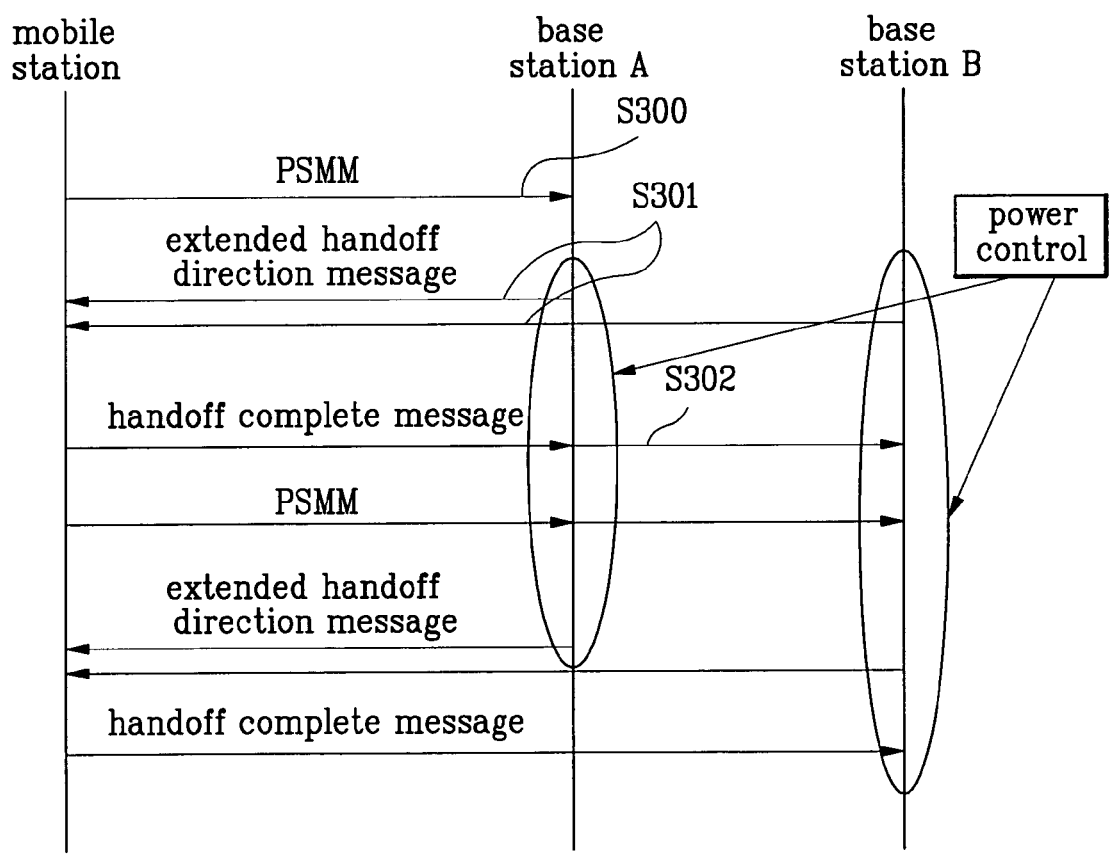
FIG. 3 is a signal flow chart during a handoff in a mobile communication system of FIG. 1.
Figure 4:
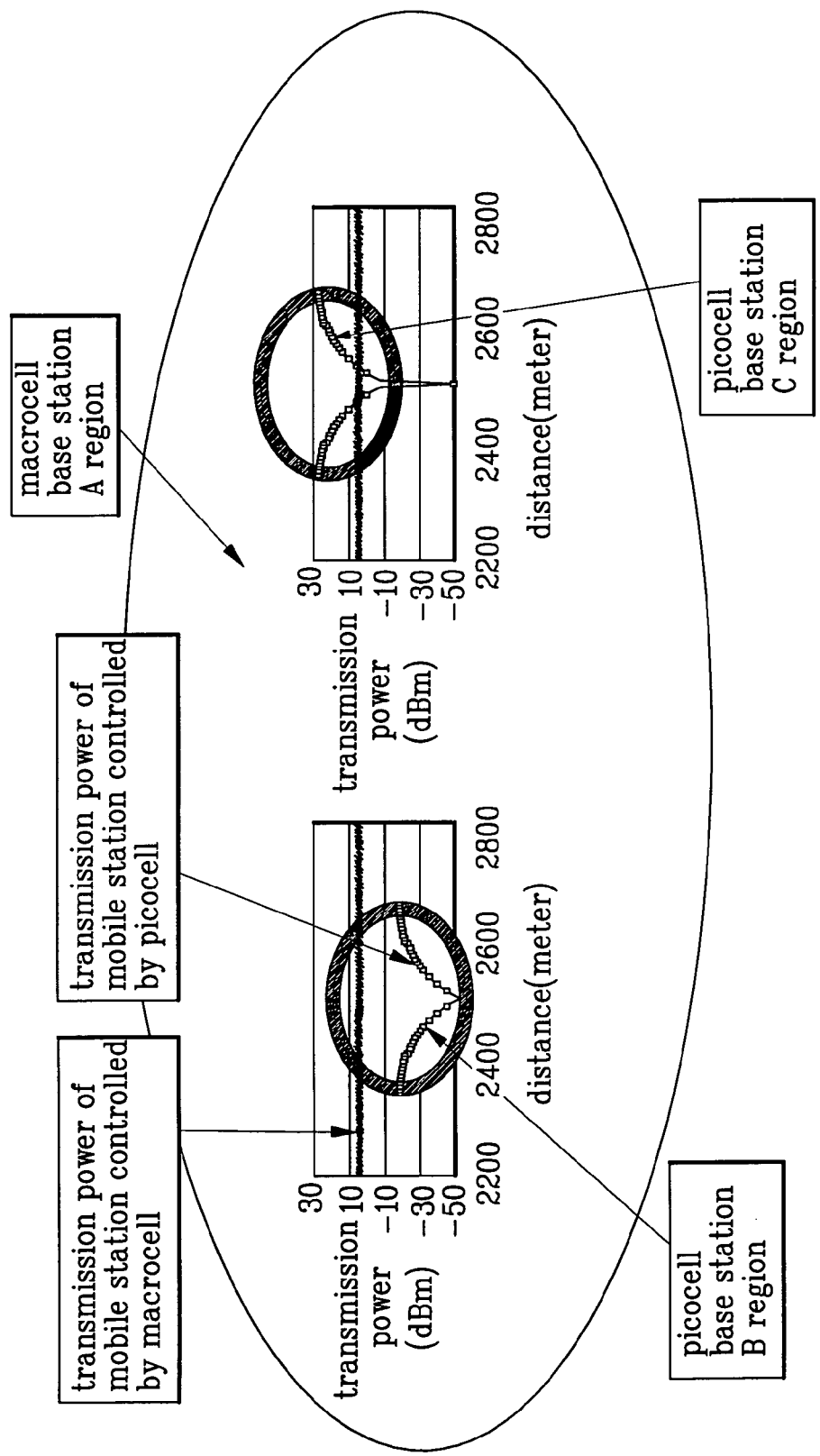
FIG. 4 shows a transmission power of a mobile station in a multilayered communication system of the related art.
Figure 5:
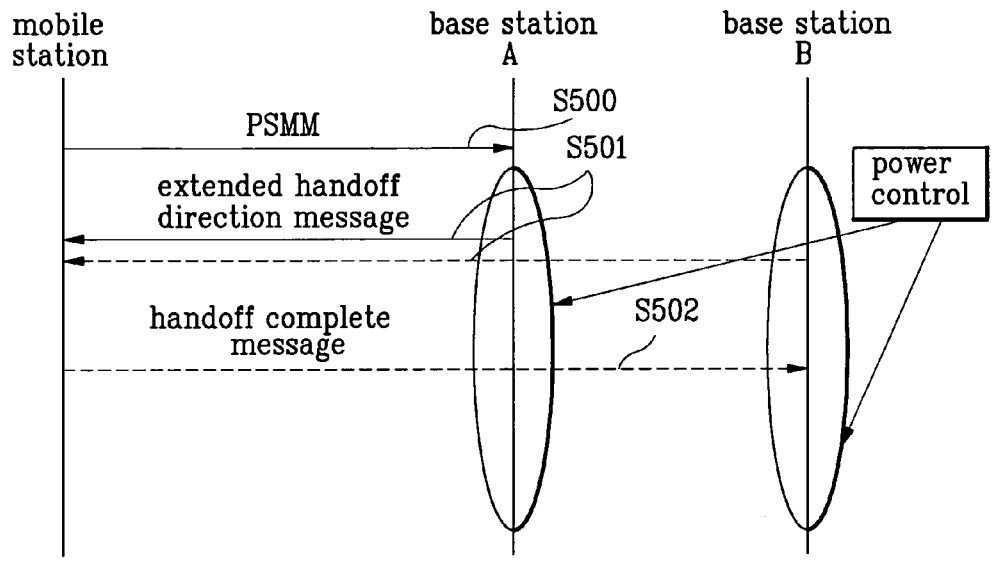
FIG. 5 is a signal flow chart during a handoff in a multilayered mobile communication system of the related art.
Figure 6:
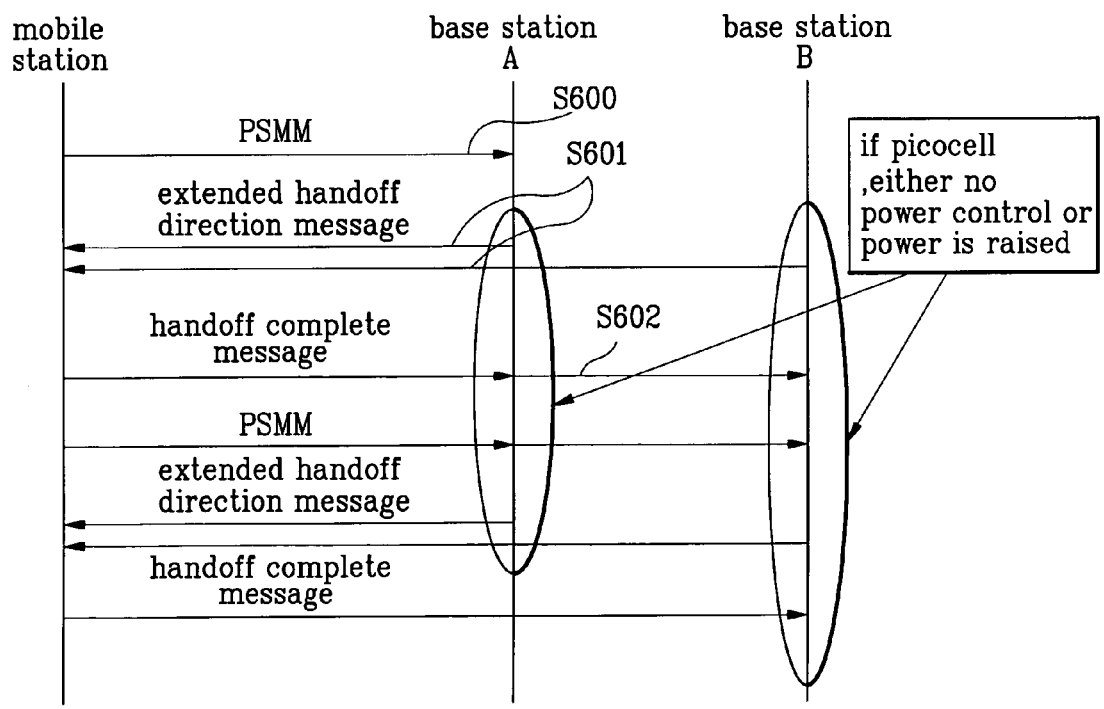
FIG. 6 is a signal flow chart during a handoff in a multilayered mobile communication system in accordance with the present invention.

Accordingly, the level of the forward link coverage can be set relatively equal to the size of the picocell by controlling the level of transmission power of the base station, and the level of the reverse link coverage can be set greater than the forward link coverage by not using a signal attenuator when the base station receives a signal wave. FIG. 6 shows a signal flow chart during a handoff in a multilayered mobile communication system in accordance with the present invention.

Referring to FIG. 6, assume that base station A provides service to a macrocell, and base station B provides service to a picocell in the macrocell. If a mobile station in the macrocell moves towards the picocell and enters into a handoff region between the macrocell and the picocell, the mobile station transmits a PSMM to base station A, which is the serving base station (S600). A base station controller, which controls both base stations A and B, then analyzes the PSMM from the mobile station and requests base station B to allocate a channel to execute a soft handoff, if the base station controller determines that a handoff is required.

At this time, base station B, according to the present invention, either does not control the transmission power of the mobile station, i.e. maintains the transmission power, or transmits a power control command to the mobile station to increase the power.

A base station in the related art performs a power control to lower the signal power from a mobile station if a signal to noise ratio (SNR) of the signal from the mobile station is greater than a predetermined value. Similarly, the base station in the related art performs a power control to increase the signal power from a mobile station if the SNR is smaller than the predetermined value.

However, in the present invention, a base station which provides service to the picocell either does not perform a power control or transmits a power control command to increase the power level, regardless of the SNR, if the mobile station is in a handoff region between a macrocell and a picocell. Thus, base station B, i.e., a base station which provides service to a picocell, does not pull down a signal power of the mobile station.

Accordingly, the mobile station can transmit a signal at a transmission power level relatively equal to a transmission power level as when a mobile station is connected with base station A, and base station B allocates a channel according to the request of the base station controller. Thereafter, base station B notifies the base station controller of the allocation. Upon receiving information of the channel assignment from base station B, the base station controller requests both base stations A and B to execute a handoff using the assigned channel information, and transmits an extended handoff direction message to the mobile station through both base station A and base station B (S601).

After receiving the extended handoff direction message, the mobile station adds base station B to the active group, sets up a communication channel to base station B, transmits a handoff complete message to both base stations A and B, and enters a handoff state (S602). During the transmission of the extended handoff direction message and the handoff complete message, base station B, i.e. the picocell base station, according to the present invention either does not perform a control of the transmission power of the mobile station or transmits a command to increase the transmission power.

Furthermore, if base station A provides service to a macrocell and base station C provides service to a picocell in the macrocell, and if a mobile station in a picocell moves towards the macrocell and enters into a handoff region between the picocell and macrocell, the mobile station transmits a PSMM to base station C, the serving base station. A base station controller, which controls both base stations A and B, then analyzes the PSMM from the mobile station and requests base station A to allocate a channel to execute a soft handoff, if the base station controller determines that a handoff is required.

At this time, base station C, according to the present invention, either does not control the transmission power of the mobile station or transmits a power control command to the mobile station to increase the power. Since base station C does not pull down the transmission power of the mobile station, the mobile station can pull up the transmission power, under the control of base station A, to a level relatively equal to a transmission power as when the mobile station is connected to base station A.

Accordingly, base station A allocates a channel according to the request of the base station controller and notifies the base station controller of the allocation. Upon receiving information of the channel assignment from base station A, the base station controller requests both base stations A and C to execute a handoff using the assigned channel information, and transmits an extended handoff direction message to the mobile station through both base station A and base station C.

After receiving the extended handoff direction message, the mobile station adds base station C to the active group, sets up a communication channel to base station C, transmits a handoff complete message to both base stations A and C, and enters a handoff state. As in the first case, base station C, i.e. the picocell base station, according to the present invention either does not perform a control of the transmission power of the mobile station or transmits a command to increase the transmission power, during the transmission of the extended handoff direction message and the handoff complete message.

Figure 7:
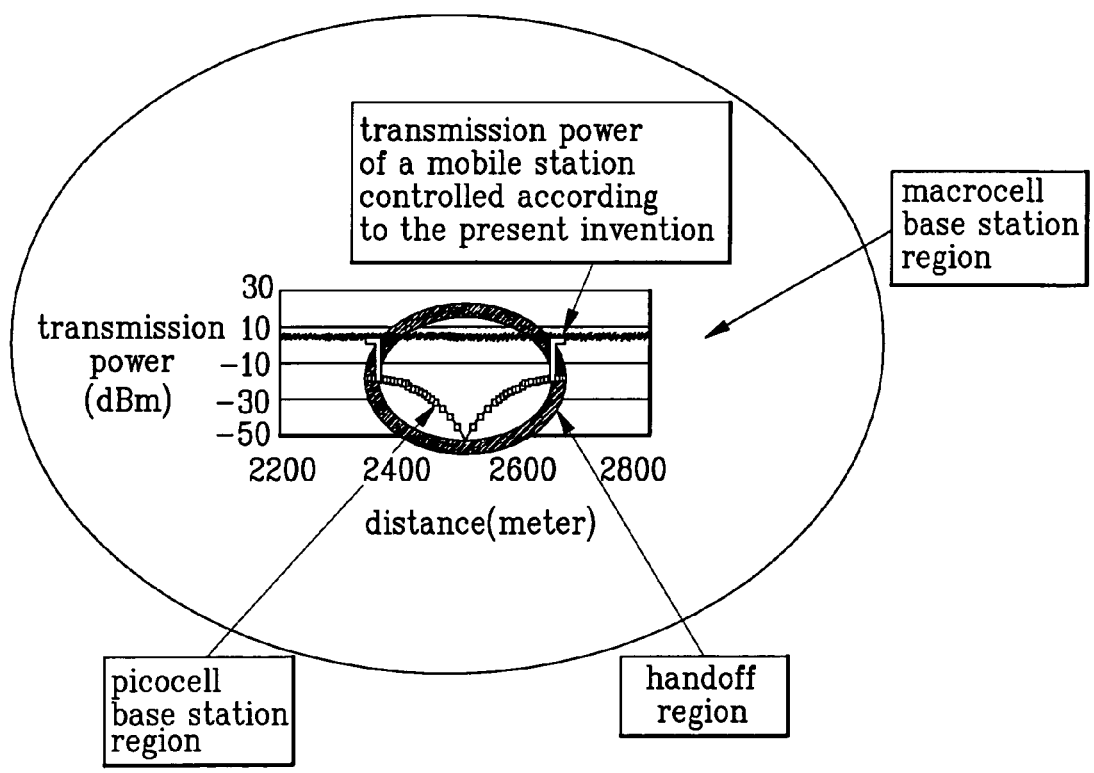
FIG. 7 shows a transmission power of a mobile station in a multilayered communication system of the present invention.

FIG. 7 shows a transmission power of a mobile station during a handoff in a multilayered communication system according to the present invention. Referring to FIG. 7, a shaded portion represents a handoff region between a macrocell and the picocell. With respect to the handoff region, an inner portion represents a picocell region served by a base station, and an outer portion represents a macrocell region served by a base station.

When a mobile station moves either from the macrocell toward the picocell or from the picocell toward the macrocell, the base station serving the picocell does not give a power control command to pull down the transmission power in the handoff region. Thus, the mobile station in the handoff region can transmit signals at a level of transmission power equal to a level as when the mobile station is connected to the base station serving the macrocell. Accordingly, the power control method of a base station according to the present invention allows a mobile station within a handoff region between a macrocell and a picocell to maintain a preset transmission power without reduction, thereby allowing a smooth soft handoff.

As explained above, by not controlling a transmission signal power of a mobile station or by performing a power control to pull up the transmission signal power of a mobile station from a base station serving a picocell when the mobile station moves between a picocell and a macrocell in a multilayered base station system, a smooth soft handoff can be executed. Also, the greater reverse link coverage than the forward link coverage established according to the present invention reduces power consumption of a mobile station, thereby increasing the life of the mobile station in a picocell and increasing a system capacity limited by an interference.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A power control method in a multilayered communication system comprising:
    determining if a mobile station is within a soft handoff region between a macrocell region and a picocell region; and
    performing a power control such that a transmission power level of said mobile station is not lowered, if said mobile station is determined to be within said soft handoff region and if a soft handoff of said mobile station is required, wherein the transmission power level of said mobile station is not lowered during a transmission of an extended handoff direction message and a handoff complete message, wherein when a base station that provides service to said picocell determines a prescribed condition for the mobile station that allows reducing the transmission power level of the mobile station, the base station that provides service to said picocell performs power control to maintain or increase the transmission power level of said mobile station.

2. The method of claim 1, wherein a base station which provides service to said picocell performs a power control to maintain the transmission power level of said mobile station.

3. The method of claim 1, wherein a base station which provides service to said picocell performs a power control to increase the transmission power level of said mobile station.

4. The method of claim 1, further comprising: setting a reverse link coverage of said picocell greater than a forward link coverage of said picocell.

5. The method of claim 4, further comprising: controlling a level of transmission power of a base station which provides service to said picocell to set said forward link coverage relatively equal to a size of said picocell.

6. The method of claim 5, wherein setting said reverse link coverage greater than said forward link coverage comprises not attenuating signal waves when received by a base station which provides service to said picocell.

7. The method of claim 4, wherein setting said reverse link coverage greater than said forward link coverage comprises not attenuating signal waves when received by a base station which provides service to said picocell.

8. The method of claim 1, wherein the prescribed condition is a signal-to-noise ratio greater than a predetermined value.

9. A power control method of a base station in a multilayered communication system comprising:
    determining if a mobile station is within a soft handoff region between a macrocell region and a picocell region;
    setting a reverse link coverage of said picocell greater than a forward link coverage of said picocell, if said mobile station is determined to be within said soft handoff region and if a soft handoff of said mobile station is required; and
    performing a power control such that a transmission power level of said mobile station is not lowered during a transmission of an extended handoff direction message and a handoff complete message, if said mobile station is determined to be within said soft handoff region and if a soft handoff of said mobile station is required.

10. The method of claim 9, wherein a base station which provides service to said picocell performs a power control to maintain the transmission power level of said mobile station.

11. The method of claim 10, further comprising: controlling a level of transmission power of a base station which provides service to said picocell to set said forward link coverage relatively equal to a size of said picocell.

12. The method of claim 10, further comprising:
    setting said reverse link coverage greater than said forward link coverage by not attenuating signal waves when received by a base station which provides service to said picocell.

13. The method of claim 9, wherein a base station which provides service to said picocell performs a power control to increase the transmission power level of said mobile station.

14. The method of claim 13, further comprising: controlling a level of transmission power of a base station which provides service to said picocell to set said forward link coverage relatively equal to a size of said picocell.

15. The method of claim 13, further comprising:
    setting said reverse link coverage greater than said forward link coverage by not attenuating signal waves when received by a base station which provides service to said picocell.

16. The method of claim 9, further comprising:
    controlling a level of transmission power of a base station which provides service to said picocell to set said forward link coverage relatively equal to a size of said picocell.

17. The method of claim 9, further comprising:
    setting said reverse link coverage greater than said forward link coverage by not attenuating signal waves when received by a base station which provides service to said picocell.

18. The method of claim 9, wherein when a base station that provides service to said picocell determines a prescribed condition for the mobile station that allows reducing the transmission power level of the mobile station, the base station that provides service to said picocell performs power control to maintain or increase the transmission power level of said mobile station.

19. The method of claim 18, wherein the prescribed condition is a signal-to-noise ratio greater than a predetermined value.

20. A power control method of a base station in a multilayered communication system comprising:
    determining if a mobile station is within a soft handoff region between a macrocell region and a picocell region;
    setting a reverse link coverage of said picocell greater than a forward link coverage of said picocell, if said mobile station is determined to be within said soft handoff region and if a soft handoff of said mobile station is required, wherein controlling a level of transmission power of a base station which provides service to said picocell to set said forward link coverage relatively equal to a size of said picocell and setting said reverse link coverage greater than said forward link coverage by not attenuating signal waves when received by said base station; and
    performing a power control at said base station, if said mobile station is determined to be within said soft handoff region and if a soft handoff of said mobile station is required, wherein said base station either maintains the transmission power level of said mobile station or increases the transmission power level of said mobile station.

* * * * *